(12) United States Patent
Hendriks

(10) Patent No.: US 7,130,134 B2
(45) Date of Patent: *Oct. 31, 2006

(54) OPTICAL SCANNING DEVICE

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 57 days.

This patent is subject to a terminal disclaimer.

(21) Appl. No.: 10/498,300

(22) PCT Filed: Dec. 6, 2002

(86) PCT No.: PCT/IB02/05227

§ 371 (c)(1),
(2), (4) Date: Jun. 9, 2004

(87) PCT Pub. No.: WO03/052750

PCT Pub. Date: Jun. 26, 2003

(65) Prior Publication Data

US 2005/0018266 A1    Jan. 27, 2005

(30) Foreign Application Priority Data

Dec. 14, 2001 (EP) ................... 01204881

(51) Int. Cl.
*G02B 13/18* (2006.01)
*G11B 7/00* (2006.01)
(52) U.S. Cl. .................. 359/717; 359/719; 369/112.24
(58) Field of Classification Search ............... 359/708, 359/718, 719, 717; 369/112.24
See application file for complete search history.

(56) References Cited

U.S. PATENT DOCUMENTS

2005/0068879 A1 * 3/2005 Tukker et al. .............. 369/106

* cited by examiner

*Primary Examiner*—Scott J. Sugarman

(57) ABSTRACT

The invention relates to an optical scanning device (1) for scanning an information layer (2) by means of a radiation beam (4). The device includes: a radiation source (6) for providing said radiation beam, a lens system (7) for transforming said radiation beam to a converging beam (16), and a wavefront modifier including a first element (301) and a second element (302) having each an aspheric surface and being mutually movable in a plane perpendicular to an optical axis (12) of said lens system for introducing a wavefront modification ($W_1$) in said converging beam. According to the invention, the aspheric surfaces of said first and second elements are shaped so that a mutual rotational displacement of the elements about an axis of rotation ($Z_A$) which is parallel to said optical axis (12) generates said wavefront modification ($W_1$).

11 Claims, 7 Drawing Sheets

FIG. 4 (I-I)

FIG. 5 (II-II)

Figure 1:
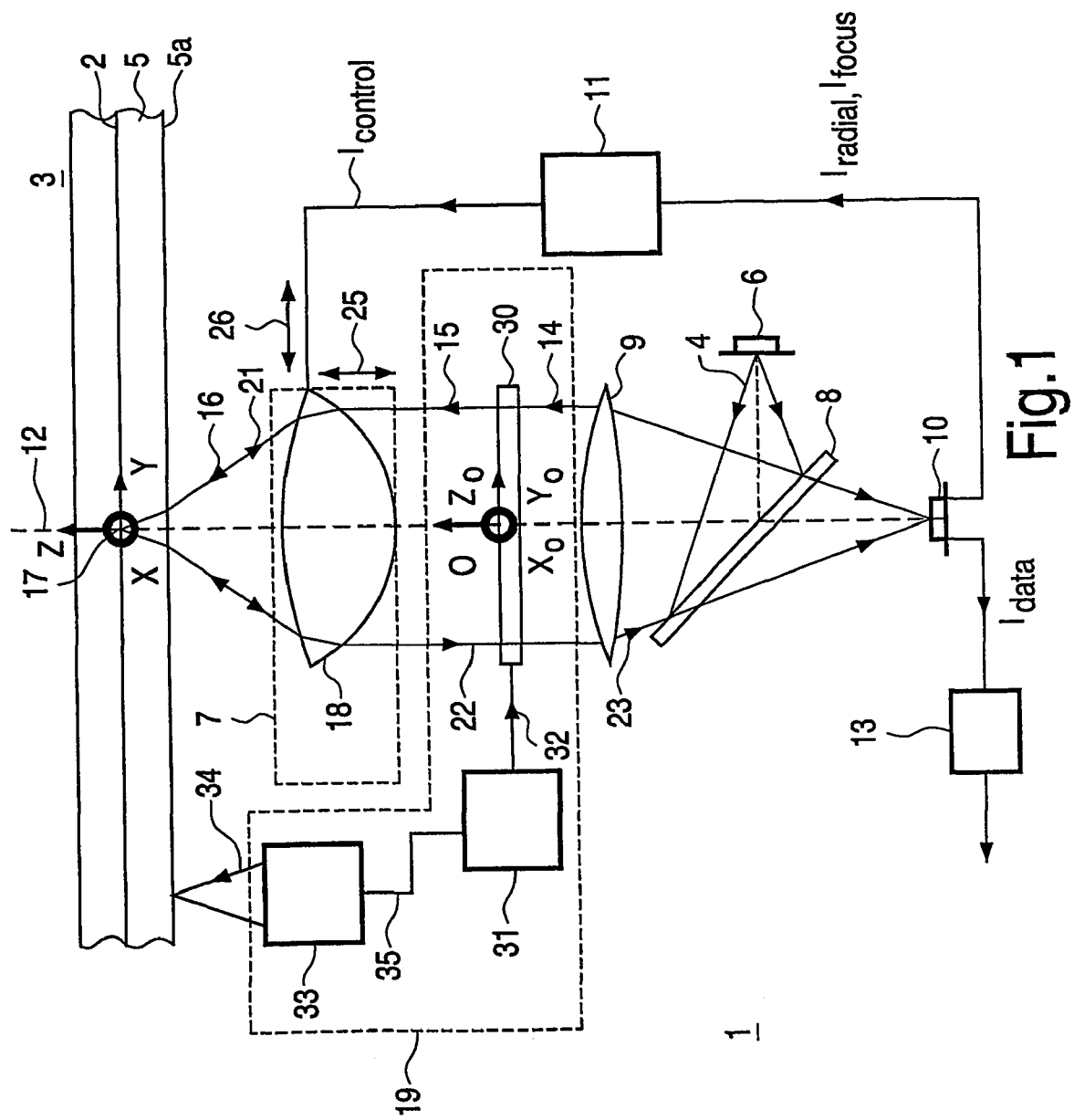

OPTICAL SCANNING DEVICE

The invention relates to an optical scanning device for scanning an information layer of an optical record carrier by means of a radiation beam, including: (a) a radiation source for providing said radiation beam, (b) a lens system for transforming said radiation beam to a converging radiation beam so as to form a scanning spot in the position of the information layer, the lens system including a first objective lens having an optical axis, and (c) a wavefront modifier arranged between said radiation source and the position of said scanning spot, the wavefront modifier including a first element having a first aspheric surface and a second element having a second aspheric surface, said first and second elements being mutually movable in a plane perpendicular to said optical axis for introducing a modification $W_1$ in said converging beam.

The invention also relates to a wavefront modifier for transforming a first radiation beam into a second radiation beam, the wavefront modifier having an optical axis and including a first element having a first aspheric surface and a second element having a second aspheric surface, said first and second elements being mutually movable in a plane perpendicular to said optical axis for introducing a wavefront modification $W_1$ in said second radiation beam.

A "wavefront modifier" is used for introducing a "wavefront modification", that is for modifying the shape of the wavefront of a radiation beam by introducing path length differences in dependence on the position in the cross-section of the beam. A wavefront modification may be of a first, second, etc. order of a radius in the cross-section of the radiation beam if the mathematical function describing the wavefront modification has a radial order of three, four, etc., respectively. Wavefront tilt or distortion is an example of a wavefront modification of the first order. Astigmatism and curvature of field and defocus are two examples of a wavefront modification of the second order. Coma is an example of a wavefront modification of the third order. Spherical aberration is an example of a wavefront modification of the fourth order. It is noted that some wavefront modifications, such as wavefront tilt, astigmatism and coma, are dependent on a direction in the cross-section of the radiation beam. Some wavefront modifications, such as defocus and spherical aberration, are independent on a direction in the cross-section of the radiation beam. For more information on the mathematical functions representing the aforementioned wavefront modifications, see, e.g. the book by M. Born and E. Wolf entitled "Principles of Optics," pp. 464–470 (Pergamon Press 6$^{th}$ Ed.) (ISBN 0-08-026482-4).

The wavefront modifier may be used for changing properties of the radiation beam such as its vengeance by introducing a focus curvature in the wavefront of the beam or to change the direction of the beam by introducing tilt. A wavefront modifier may also operate as a wavefront compensator for compensating an undesired shape of the wavefront of the radiation beam, e.g. for removing an optical aberration such as spherical aberration or coma from the wavefront of the radiation beam.

"Scanning an information layer" refers to scanning by a radiation beam for: reading information from the information layer ("reading mode"), writing information in the information layer ("writing mode"), and/or erasing information from the information layer ("erase mode"). "Information density" refers to the amount of stored information per unit area of the information layer. It is determined by, inter alia, the size of the scanning spot formed by the scanning device on the information layer to be scanned. The information density may be increased by decreasing the size of the scanning spot. Since the size of the spot depends, inter alia, on the wavelength $\lambda$ and the numerical aperture NA of the radiation beam forming the spot, the size of the scanning spot can be decreased by increasing NA and/or by decreasing $\lambda$.

When scanning an optical record carrier having the shape of a disc with an optical scanning device of the type described in the opening paragraph, a problem is the generation of coma in the converging beam due to a warpage of the disc in the radial direction of the disc. Such warpage results in the presence of a tilt between the optical axis of the objective lens and the normal direction of the disc. This problem is even more critical in case of record carriers having high information density, where the numerical aperture of the radiation beam incident on the record carrier is relatively high. For instance, this is the case for record carriers of the so-called DVD+RW format, where the numerical aperture of the incident beam approximately equals 0.65.

A solution to said problem of generation of coma consists in using a wavefront modifier arranged in the optical path of the light between the radiation source and the position of the scanning spot, the modifier comprising a pair of plates having each a flat surface and an aspheric surface. Such a modifier is known from the article by I. Palusinski et al entitled "Lateral shift variable aberration generators", Applied Optics Vol. 38 (1999) pp. 86–90. The plates are complementary such that when mated they form a flat plate having no optical power. A mutual linear displacement of the two plates in one direction perpendicular to the optical axis of the lens system results in the generation of a wave-front deformation which depends on the linear displacement and the shape of the aspheric surfaces.

An object of the invention is to provide an optical scanning device including a wavefront modifier which is an alternative to the one described in said article by Palusinski, for correcting the wavefront modification in the converging beam incident on the record carrier to be scanned.

This object is achieved by the optical scanning device as described in the opening paragraph wherein, according to the invention, said first and second aspheric surfaces are shaped so that a mutual rotational displacement of said first and second elements over an angle of rotation about an axis of rotation which is parallel to said optical axis generates said wavefront modification.

An advantage of generating the second wavefront modification by a rotational displacement of such elements is that the construction of the wavefront modifier is simple, robust and cheap. The construction of a rotational displacement about one axis of rotation requires, for instance, only one elastic foil, one magnet and one coil, as opposed to the known wavefront modifier wherein a linear displacement along a reference direction must be realized.

In a preferred embodiment of the optical scanning device, the shapes of said first aspheric surface is defined by a function S which includes:

the term "$(y+R)(x^2+(y+R)^2-yR)$" in order to introduce coma along the $X_O$-axis in said converging radiation beam (16), the term $$\text{``}-R(2(x^2+(y+R)^2)+R^2)\arctan\left(\frac{y+R}{x}\right)-$$

$$(x^2+(y+R)^2+3R^2)+Rx(y+R)\text{''}$$

in order to introduce coma along the $Y_O$-axis in said converging radiation beam (16), the term "y+R" in order to introduce tilt along the $X_O$-axis in said converging radiation beam (16), the term "x" in order to introduce tilt along the $Y_O$-axis in said converging radiation beam (16), the term $$"(x^2 + (y + R)^2)\arctan\left(\frac{y+R}{x}\right) + 2Rx"$$

in order to introduce defocus aberration in said converging radiation beam (16), the term $$"(x^2 + (y + R)^2)\arctan\left(\frac{y+R}{x}\right) + x(y + R)"$$

in order to introduce astigmatism along the $X_O$-axis in said converging radiation beam (16), the term $$"(x^2 + (y + R)^2)\arctan\left(\frac{y+R}{x}\right) - x(y + R)"$$

in order to introduce astigmatism along the $Y_O$-axis in said converging radiation beam (16), the term $$"((x^2 + (y + R)^2)^2 + 4R^2(x^2 + (y + R)^2) + R^4)\arctan\left(\frac{y+R}{x}\right) +$$
$$4R((x^2 + (y + R)^2) + R^2)x - 2R^2 x(y + R)"$$

in order to introduce spherical aberration in said converging radiation beam (16), the term $$"-\frac{2}{3}x^3 - x(y + R)^2"$$

in order to introduce line coma along the $Y_O$-axis in said converging radiation beam (16), the term $$"x^2(y + R) + \frac{2}{3}(y + R)^3"$$

in order to introduce line coma along the $X_O$-axis in said converging radiation beam (16), where "(x, y)" are the Cartesian coordinates in the direct orthogonal system $X_O Y_O$ in said reference plane $(X_A Y_A)$ and having its origin on the second point of intersection (O) of said optical axis (12) and said reference plane, the $Y_O$-axis passing through said first point of intersection (A), and "R" is the distance between said first point of intersection (A) and said second point of intersection (A).

An advantage of providing the function S with the term $$"-R(2(x^2 + (y + R)^2) + R^2)\arctan\left(\frac{y+R}{x}\right) -$$
$$(x^2 + (y + R)^2 + 3R^2) + Rx(y + R)"$$

is to generate coma in the $Y_O$-axis which can be used, e.g., for compensating coma generated along the radial direction by a tilt between the normal direction of the record carrier and the optical axis of the objective lens. This provides the optical device with larger tolerance to disc tilt.

An advantage of shaping the function S with the term $$"((x^2 + (y + R)^2)^2 + 4R^2(x^2 + (y + R)^2) + R^4)\arctan\left(\frac{y+R}{x}\right) +$$
$$4R((x^2 + (y + R)^2) + R^2)x - 2R^2 x(y + R)"$$

is to generate spherical aberration which can be used, e.g., for compensating spherical aberration generated due to the difference in thickness between the transparent layers for a dual layer system of the so-called DVR format. This provides the optical device with larger tolerance to spherical aberration.

Another object of the invention is to provide a wavefront modifier which is an alternative to the one described in said article by Palusinski, for introducing a wavefront modification in the radiation beam emerging from the wavefront modifier.

This object is achieved by the wavefront modifier as described in the opening paragraph wherein, according to the invention, said first and second aspheric surfaces are shaped so that a mutual rotational displacement of said first and second elements about an axis of rotation which is parallel to said optical axis generates said modification.

Figure 2:
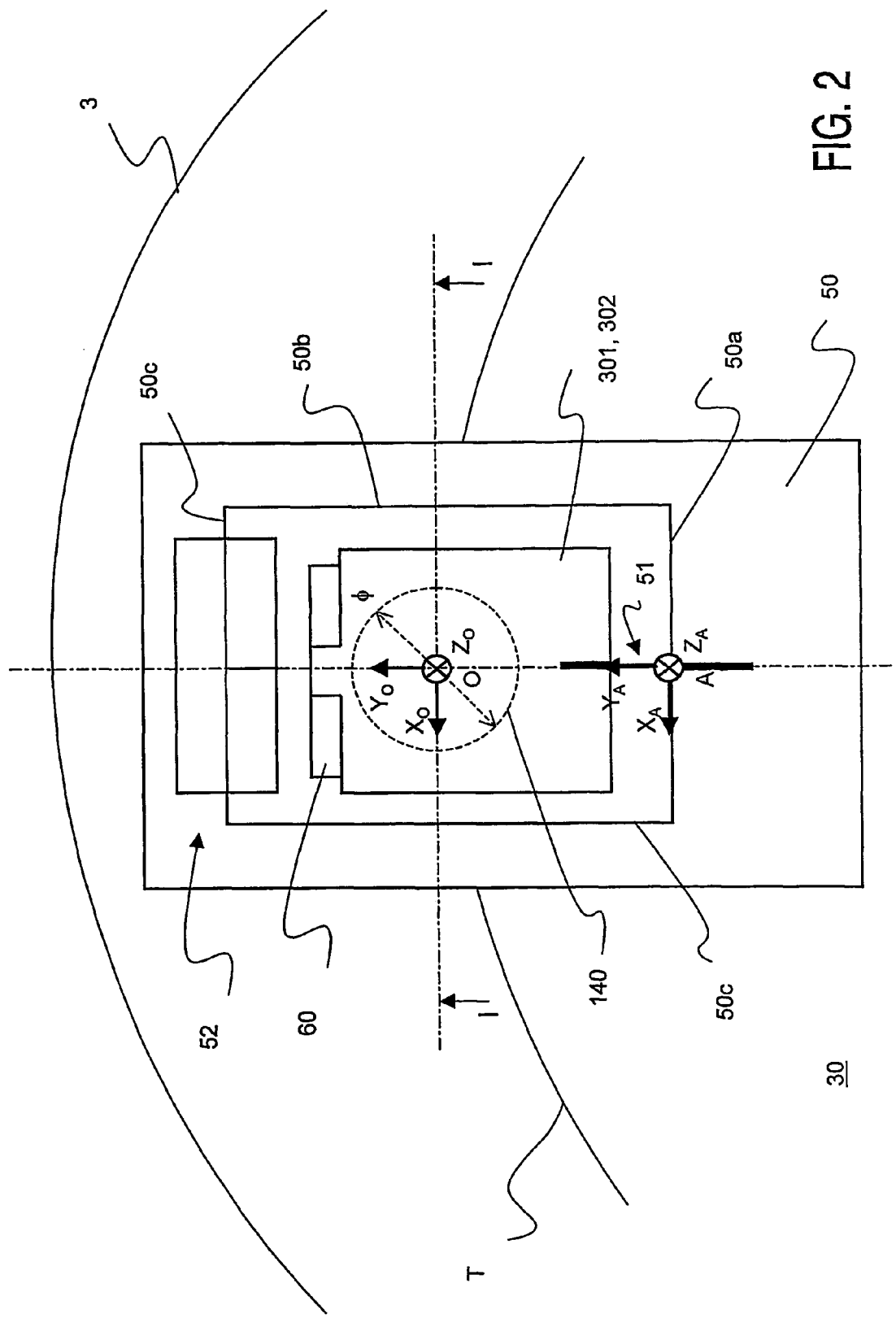
Figure 3:
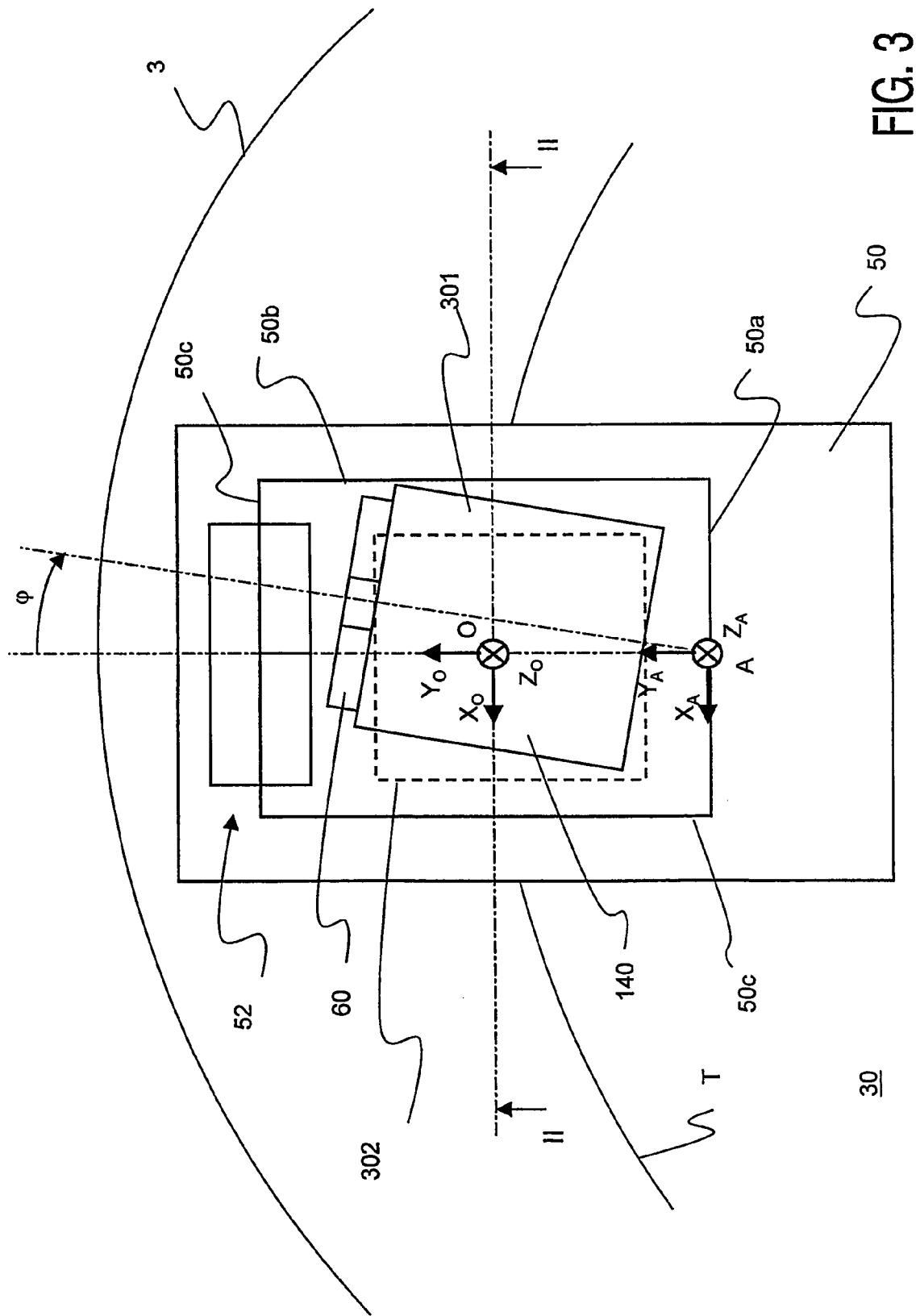
Figure 4:
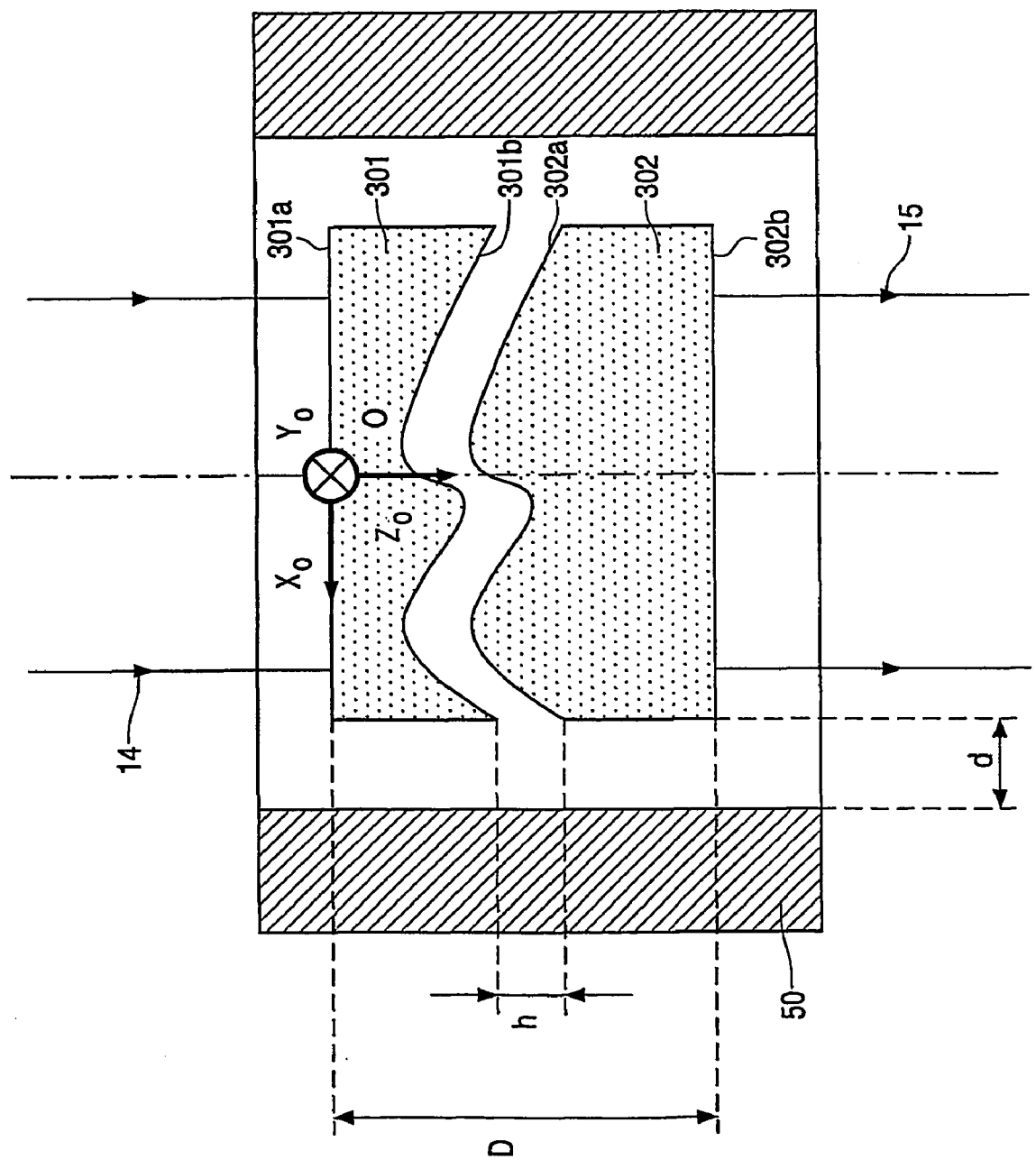
Figure 5:
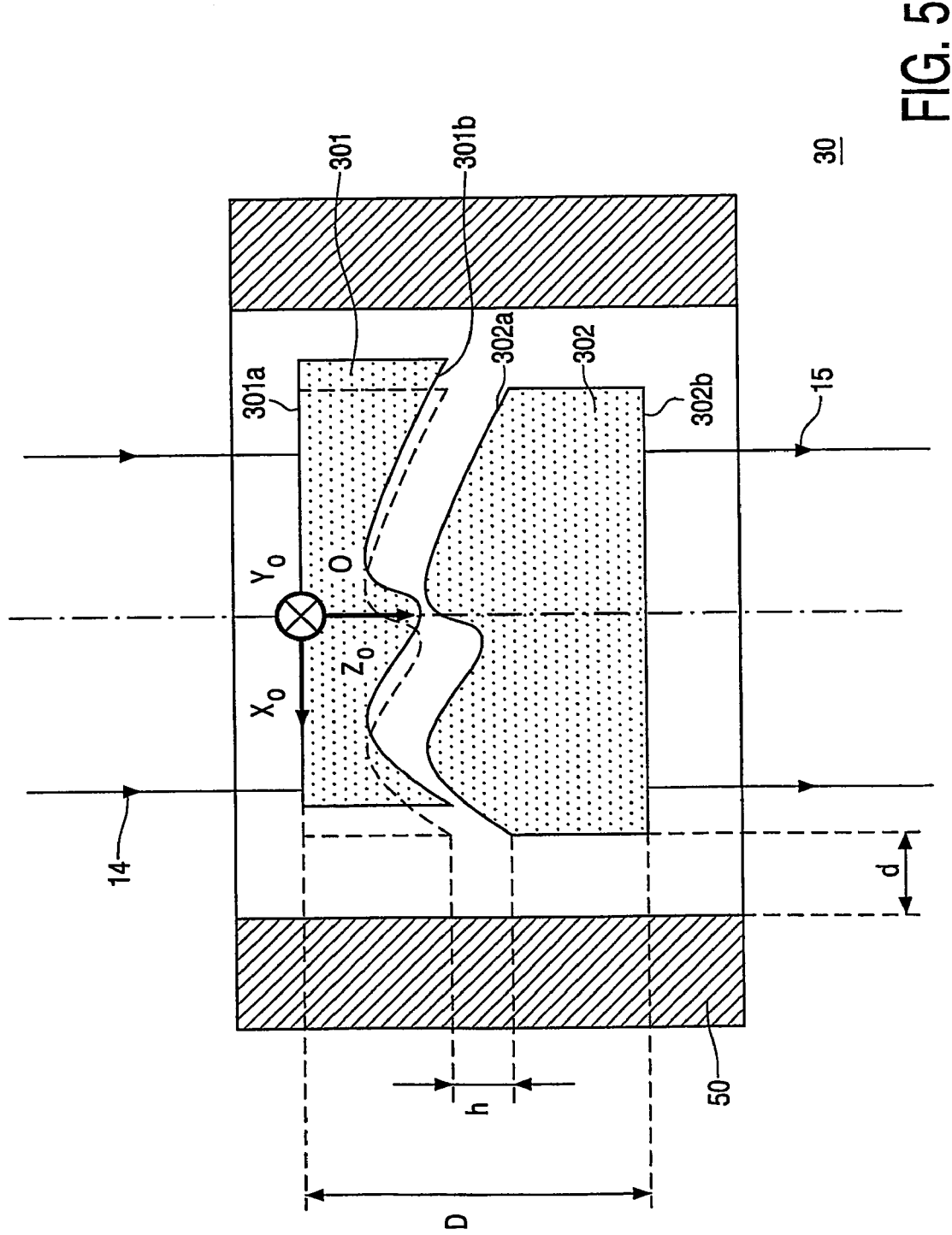
Figure 6:
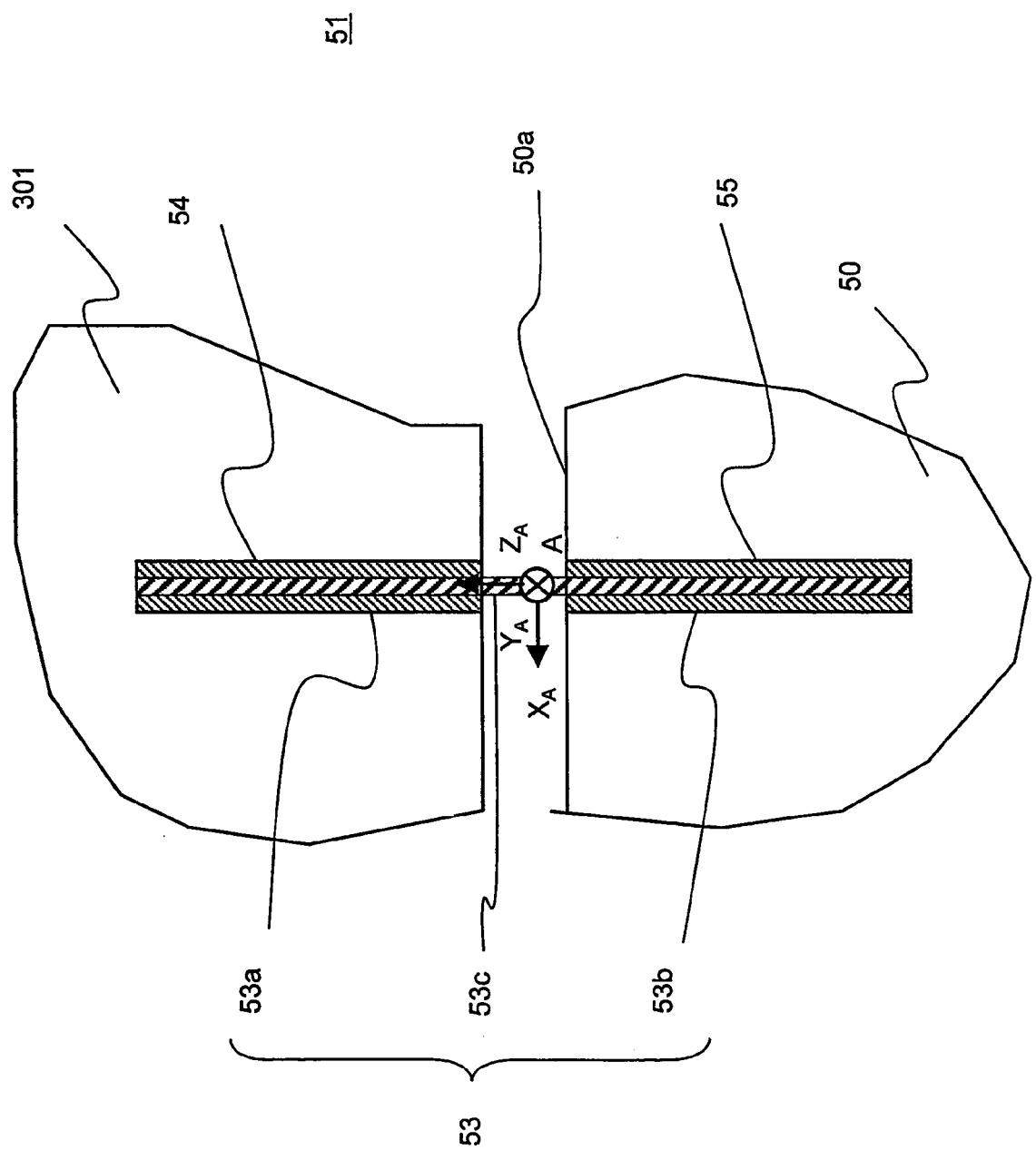
Figure 7:
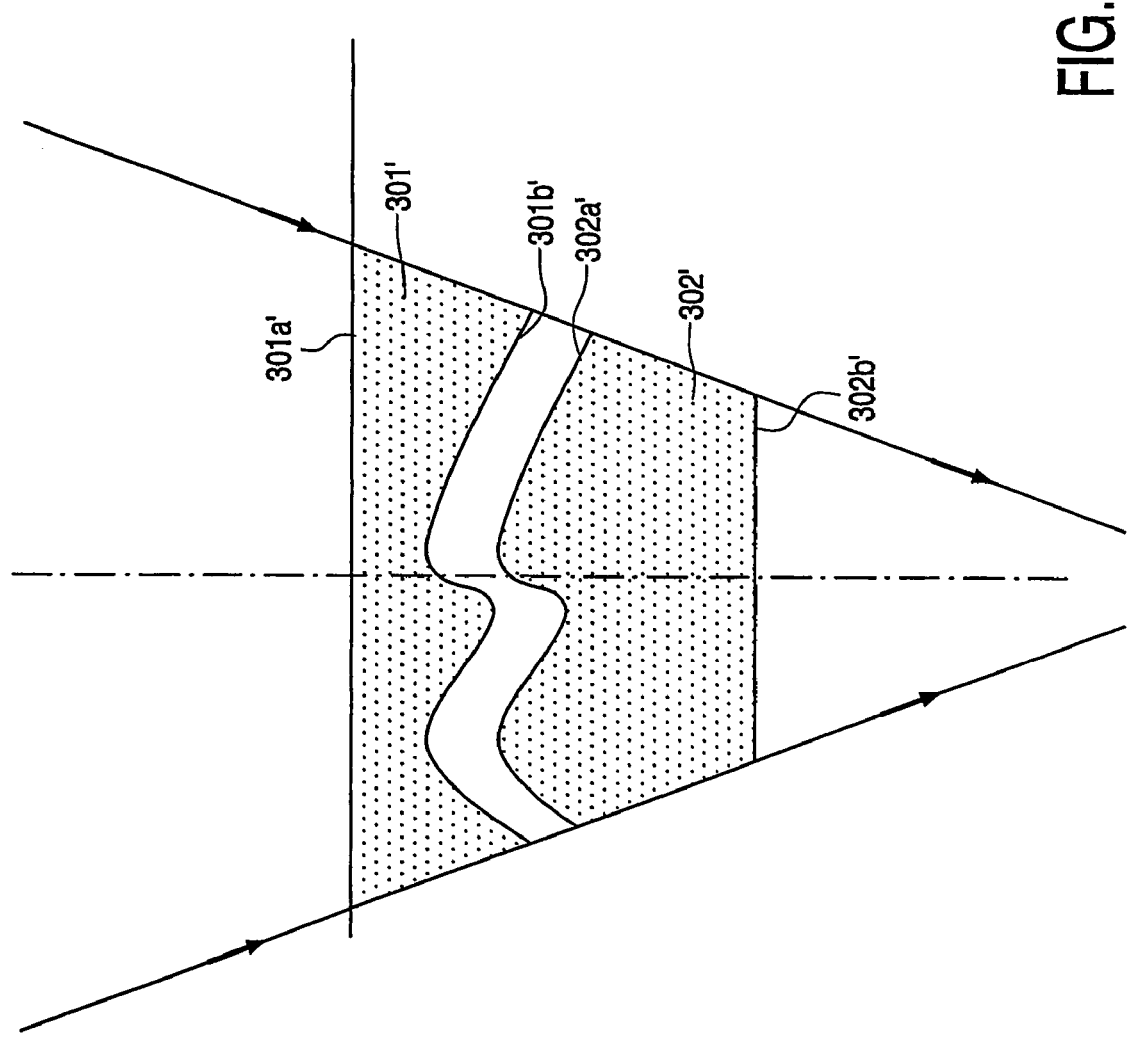

The objects, advantages and features of the invention will be apparent from the following, more detailed description of the invention, as illustrated in the accompanying drawings, in which:

FIG. 1 shows a scanning device according to the invention,

FIGS. 2 and 3 show first and second top views of a component of the scanning device shown in FIG. 1, in a first position and in a second position, respectively, FIG. 4 shows a first cross-section of the component shown in FIG. 2, along a line I—I shown in FIG. 2, FIG. 5 shows a second cross-section of the component shown in FIG. 3, along a line II—II shown in FIG. 3, FIG. 6 is a detailed view of the component shown in FIG. 2, and FIG. 7 shows an alternative of components shown in FIG. 4.

FIG. 1 shows an optical scanning device 1 according to the invention, which is used scanning a first information layer 2 of a first optical record carrier 3 with a first radiation beam 4.

The record carrier 3 comprises a transparent layer 5, one side of which is provided with the information layer 2. The side of the information layer 2 facing away from the transparent layer 5 may be protected from environmental influences by a protective layer. The transparent layer 5 acts as a substrate for the record carrier 3 by providing mechanical support for the information layer 2. Alternatively, the transparent layer 5 may have the sole function of protecting the information layer 2, while the mechanical support is provided by a layer on the other side of the information layer 2, for instance by the protective layer or by an additional information layer and transparent layer connected to the information layer 2. The information layer 2 is a surface of the record carrier 3 that contains tracks. A track is a path to be followed by a focused or converging radiation beam on which path optically-readable marks that represent information are arranged. In the following, the reference "T" designates such a track. The marks may be, e.g., in the form of pits or areas having a reflection coefficient or a direction of magnetization different from the surroundings. With reference to FIG. 1 and seq. and in the case where the record carrier 3 has the shape of a disc having a center C and includes tracks that are substantially circular with the center C, "Y" is the reference axis parallel to the "radial direction," that is, the direction between the center C and a point of a track to be scanned, and "X" is the reference axis parallel to the "tangential direction," that is, the direction that is tangential to the track and perpendicular to the "radial direction" in the plane of the disc. Also with reference to FIG. 1 et seq., "Z" is the reference axis of an optical axis 12 of the optical scanning device 1. It is noted that (X, Y, Z) is a direct orthogonal coordinate system, when the disc 3 is parallel to the plane XY.

By way of illustration only, in the case where the optical record carrier 3 is a disc of the so-called DVR-format, the thickness of the transparent layer 5 approximately equals 0.1 mm. Alternatively, in the case where the record carrier 4 is a disc of the so-called DVD-format, the thickness of the transparent layer 5 approximately equals 0.6 mm.

The optical scanning device 1 includes a radiation source 6, a lens system 7 having an optical axis 12, and a wavefront modifier 30. The device 1 further includes a beam splitter 8, a collimator lens 9, a detection system 10, a servosystem 11, a focus actuator (not shown in FIG. 1), a radial actuator (not shown in FIG. 1), and an information processing unit 14 for error correction.

The radiation source 6 is arranged for supplying the radiation beam 4 for scanning the information layer 2 of the record carrier 3. Preferably, the radiation source 6 includes at least a semiconductor laser that emits the radiation beam 4 at a selected wavelength λ. By way of illustration only, the wavelength λ preferably equals 405 and 660 nm in the case where the record carrier 3 is a DVR-format disc and a DVD-format disc, respectively. Furthermore, the radiation source 6 may be provided with a grating structure (not shown in FIG. 1) for forming a first satellite radiation beam and a second satellite radiation beam (which are not shown in FIG. 1) as the −1 and +1 order diffracted radiation beams from the central radiation beam 4.

The beam splitter 8 reflects the radiation beam 4 toward the collimator lens 9. Preferably, the beam splitter 8 is formed by a plane parallel plate that is tilted with respect to the optical axis 12.

The collimator lens 9 transforms the radiation beam 4 to a collimated radiation beam 14.

The lens system 7 transforms the collimated beam 14 into a converging radiation beam 16 so as to form a scanning spot 17 in the position of the information layer 2. The converging beam 16 has a numerical aperture NA. By way of illustration only, in the case where the optical record carrier 3 is a disc of the so-called DVR-format, the numerical aperture NA of the converging beam 16 approximately equals 0.85 for both the reading mode and the writing mode. In the case where the optical record carrier 3 is a disc of the so-called DVD-format, the numerical aperture NA of the converging beam 16 approximately equals 0.60 for the reading mode and 0.65 for the writing mode.

The lens system 7 includes a first objective lens 18 having an entrance surface 18a and an exit surface 18b. The lens system 7 may further include a second objective lens (not shown in FIG. 1), preferably in the case where the numerical aperture NA approximately equals 0.85. The second objective lens, together with the objective lens 18, forms a doublet-lens system that advantageously has a larger tolerance in mutual position of the optical elements than a single-lens system formed only by the objective lens 18. The second objective lens is formed by a plano-convex lens having a convex surface that faces the objective lens 18 and a flat surface that faces the position of the information layer 2. Furthermore, the entrance surfaces and/or exit surfaces of the first and/or second objective lens(es) are preferably aspherically curved for compensating, e.g., spherical aberration, by using a process known from, e.g., the article by B. H. W. Hendriks and P. G. J. M. Nuyens entitled "Designs and manufacturing of far-field high NA objective lenses for optical recording," 413–414, SPIE 3749 (1999). It is noted that other kinds of wavefront modification can be corrected by designing aspherical lenses. However, such a correction depends on parameters that have been predetermined when designing the lenses; it remains the same irrespective of the actual configuration of the components of the optical scanning device 1, as opposed to the servo correction introduced by the wavefront modifier 30 (see below).

During scanning, the forward converging radiation beam 16 reflects on the information layer 2, thereby forming a backward diverging radiation beam 21 which returns on the optical path of the forward converging radiation beam 16. The lens system 7 transforms the backward radiation beam 21 to a backward collimated radiation beam 22. The collimator lens 9 transforms such a backward collimated radiation beam to a backward non-collimated radiation beam 23. The beam splitter 8 separates the forward radiation beam 4 from the backward radiation beam 23 by transmitting at least part of the backward radiation beam 23 towards the detection system 10.

The detection system 10 is arranged for capturing said part of the backward radiation beam 23 and converting it into one or more electric signals. One of the signals is an information signal $S_{data}$, the value of which represents the information scanned from the information layer 2. The information signal $S_{data}$ may be processed by the information processing unit 14 for error correction of the information extracted from the information layer 2. Other signals from the detection system 10 are a focus error signal $S_{focus}$ and a radial tracking error signal $S_{radial}$. The value of the signal $S_{focus}$ represents the axial difference in height along the optical axis 12 between the scanning spot 12 and the information layer 2. The signal $S_{focus}$ is formed by the commonly used "astigmatic method" which is known from, inter alia, the book by G. Bouwhuis, J. Braat, A. Huijser et al, "Principles of Optical Disc Systems," pp. 75–80 (Adam Hilger 1985) (ISBN 0-85274-785-3). The signal $S_{focus}$ is used for maintaining the scanning spot 17 in focus in the information layer 2. The value of the signal $S_{radial}$ represents the distance in the plane of the information layer 2 between the scanning spot 17 and the center of a track in this information layer to be followed by this scanning spot. The signal $S_{radial}$ is formed by the commonly used "radial push-pull method" which is known from, inter alia, said book by G. Bouwhuis et al., pp. 70–73. The signal $S_{radial}$ is used for maintaining the scanning spot 17 on track in the information layer 2.

The servosystem 11 is arranged for, in response to the signals $S_{focus}$ and $S_{radial}$, providing control signals $S_{control}$ for controlling the focus actuator and the radial actuator, respectively. The focus actuator controls the positions of the lens system 7 in a direction 25 parallel to the optical axis 12 (axis Z), thereby controlling the position of the scanning spot 17 such that it coincides substantially with the plane of the information layer 2. The radial actuator controls the positions of the lens system 7 in a direction 26 parallel to the radial direction (axis Y), thereby controlling the radial position of the scanning spot 17 such that it coincides substantially with the center line of the track to be followed in the information layer 2.

The wavefront modifier 30 is arranged between the radiation source 6 and the position of the record carrier 3 for introducing a modification $W_1$ in the converging beam 16. The wavefront modifier 30 including a pair of elements (not shown in FIG. 1 but shown in FIG. 2 et seq.) formed by a first element and a second element. The first and second elements have a first aspheric surface and a second aspheric surface elements (not shown in FIG. 1 but shown in FIGS. 4 and 5). The first and second elements are mutually movable in a plane perpendicular to the optical axis 12 for introducing the wavefront modification $W_1$ in the converging beam 16.

According to a first aspect of the invention, the first and second aspheric surfaces are shaped so that a mutual rotational displacement of the first and second elements about an axis of rotation $Z_A$ (not shown in FIG. 1 but shown in FIG. 2) which is parallel to the optical axis 12 generates the wavefront modification $W_1$. Furthermore, the shape of the first aspheric surfaces is defined by a function $S_a(r, \theta)$ and the shape of the second aspheric surface is defined by a function $S_b(r, \theta)$, the function $S_a(r, \theta)$ and $S_b(r, \theta)$ being determined by:

$$W_1(r, \theta) \approx (n_a - 1)\varphi_a \frac{\partial S_a}{\partial \theta} - (n_b - 1)\varphi_b \frac{\partial S_b}{\partial \theta} \quad (1a)$$

where "(r, $\theta$)" are polar coordinates in a reference plane $X_A Y_A$ perpendicular to the optical axis 12, these coordinates being centered on the first point of intersection A of the axis of rotation $Z_A$ and the reference plane $X_A Y_A$, "$W_1(r, \theta)$" is the wavefront modification expressed in the polar coordinates (r, $\theta$), "$n_a$" is the refractive index of the first element and "$n_b$" is the refractive index of the second element, "$\Phi_a$" is said angle of rotation of the first element and "$\Phi_b$" is said angle of rotation of the second element, and "$S_a(r, \theta)$" represents the shape of the first aspheric surface and "$S_b(r, \theta)$" represents the shape of the second aspheric surface.

According to another aspect of the invention, the first and second aspheric surfaces are shaped so that a mutual rotational displacement of the first and second elements about an axis of rotation $Z_A$ (not shown in FIG. 1 but shown in FIG. 2) which is parallel to the optical axis 12 generates the wavefront modification $W_1$. Furthermore, the shapes of the first and second aspheric surfaces are substantially identical and the shape of said first aspheric surface is defined by a function S(r, $\theta$) determined by:

$$W_1(r, \theta) \approx (n - 1)\varphi \frac{\partial S}{\partial \theta} \quad (1b)$$

where "(r, $\theta$)" are polar coordinates in a reference plane $X_A Y_A$ perpendicular to the optical axis 12, these coordinates being centered on the first point of intersection A of the axis of rotation $Z_A$ and the reference plane $X_A Y_A$, "$W_1(r, \theta)$" is the wavefront modification expressed in the polar coordinates (r, $\theta$), "n" is the refractive index of the first and second elements, "$\Phi$" is said angle of rotation, and "S(r, $\theta$)" represents the shape of the first aspheric surface.

It is noted that, in the following, the shape of a given surface is "substantially defined" by a function S means that the actual shape $S_{actual}$ of the surface meets the following condition:

$$0.9S < S_{actual} < 1.1S.$$

Preferably, the actual shape $S_{actual}$ of the surface meets the following condition:

$$0.95S < S_{actual} < 1.05S.$$

More preferably, the actual shape $S_{actual}$ of the surface meets the following condition:

$$0.99S < S_{actual} < 1.01S.$$

By way of illustration only, in the embodiment of the optical scanning device 1 shown in FIG. 1, the wavefront modifier 30 is used for introducing the wavefront modification $W_1$ in the collimated beam 14 in order to compensate an amount of coma $W_2$ that is present in the converging beam 16 due to a tilt of the record carrier 3. It is noted that the presence of coma in the converging beam means that coma is present in the radiation beam traversing the transparent layer 5, from the surface 5a of the record carrier 3 to the scanning spot 17. Thus, in this embodiment, the optical scanning device 1 includes a coma compensator 19 which includes a coma detector 33, a control circuit 31, and the wavefront modifier 30.

The coma detector 33 provides a detection signal 35 representative of the amount of coma $W_2$. In this embodiment, the coma detector 33 is a tilt detector 33 and the detection signal 35 is a tilt signal. The tilt detector 33 emits a radiation beam 34 towards the record carrier 3 and detects the angle of the radiation beam reflected by the record carrier 3. The position of the spot of the reflected beam in the plane is a measurement for the angle and, hence, for the tilt of the record carrier 3. The measured value of the tilt is directly proportional to the amount of coma $W_2$. The tilt detector 33 transforms that measured value into the tilt signal 35. It is noted that the tilt detector 33 maybe of any type. An alternative of the tilt detector 33 shown in FIG. 1 is a tilt detector formed as a part of the control circuit 31, wherein the tilt signal is derived from a combination of output signals of the detection system 10.

The control circuit 31 is arranged for, responsive to the tilt signal 35, providing control signals 32 for controlling the wavefront modifier 30.

The wavefront modifier 30 is arranged, in this embodiment, in the optical path of the collimated beam 14, between the collimator lens 9 and the lens system 7. Thus, the wavefront modifier 30 transforms the collimated beam 14 to a radiation beam 15 by introducing, in response to the tilt signal 35, the wavefront modification $W_1$ in order to compensate the amount of coma $W_2$. In other words, the wavefront modifier 30 is arranged so that:

$$W_1+W_2=0. \qquad (2)$$

FIGS. 2 and 3 show a first top view and a second top view of an embodiment of the wavefront modifier 30 shown in FIG. 1, seen from the side of the collimator lens 9. FIG. 4 shows a first cross-section of the wavefront modifier 30, seen along a line I—I shown in FIG. 2. FIG. 5 shows a second cross-section of the wavefront modifier 30, seen along a line II—II shown in FIG. 2.

As shown in FIGS. 2 through 5, the wavefront modifier 30 includes the first and second elements which are formed, in this embodiment, by a first plate 301 and a second plate 302, respectively. The wavefront modifier 30 also includes a body 50 for supporting the plates 301 and 302. As shown in FIG. 2, the wavefront modifier 30 further includes a hinge 51 for enabling, by means of control means 52, the rotational displacement about the axis $Z_A$ between, in this embodiment, the body 50 and the plate 301.

It is noted that, in FIGS. 2 and 4, the plates 301 and 302 mate each other so as to form a plane parallel plate. In FIGS. 3 and 5, there is a rotational displacement between the two plates about the axis of rotation $Z_A$, that is, in this embodiment, the plate 301 is rotated about the axis $Z_A$ and the plate 302 is stationary.

The plate 301 has an entrance surface 301a facing the collimator lens 9 and an exit surface 301b facing the plate 302. The exit surface 301b is aspherically curved (as described below). The entrance surface 301a is, in this embodiment, substantially plane. It is noted that the plane of the entrance surface 301a is defined, in this embodiment, as the reference plane $X_A Y_A$ and "A" is the point of intersection of the axis of rotation $Z_A$ and the plane entrance surface 301a. It is also noted that (A, $X_A$, $Y_A$, $Z_A$) are two direct orthogonal base.

The plate 302 (shown in dotted line in FIG. 3) has an entrance surface 302a facing the exit surface 301b of the plate 301 and an exit surface 302b facing the objective lens 18. The entrance surface 302a is aspherically curved (as described below). The exit surface 302b is, in this embodiment, substantially plane, parallel to the $X_A$-axis and the $Y_A$-axis.

It is noted that, in this embodiment, said first and second aspheric surfaces are formed by the exit surface 301b and the entrance surface 302a. It is also noted that the aspheric surfaces 301b and 302a have the same shape for any value of the polar coordinates (r, θ).

By way of illustration only, the plates 301 and 302 can be made of plastic, e.g. the material commonly known in the commerce under the designation PMMA, where the optical index equals, e.g., 1.5066.

The body 50 has four inner walls 50a through 50d arranged so as to form an opening through the body 50 in which the plates 301 and 302 are provided as explained below. By way of illustration, the body 50 is made of aluminum.

FIG. 6 is a detailed view of the hinge 51 that includes, in this embodiment, a foil 53, a first support 54 fixed to the plate 301 and a second support 55 fixed to the body 50 (on the wall 50a, in the embodiment shown in FIGS. 2 and 3). The foil 53 has a first portion 53a engaged with the support 54, a second portion 53b engaged with the support 55, and a third portion 53c that is pivotable about the axis $Z_A$. The foil 53 is made of a material having elasticity properties, e.g., spring steel so that the third portion 53c, together with the plate 301, can pivot or rotate about the axis $Z_A$. Preferably, as shown in FIGS. 2 and 3, the axis of rotation $Z_A$ is eccentric with respect to the optical axis 12. More preferably, also as shown in FIGS. 2 and 3, the axis of rotation $Z_A$ is outside of the position of the cross-section 140 of the collimated beam 14 that is incident on the entrance surface 301a of the plate 301. By way of illustration only, the distance R between the point A and the center O equals to 3.6 mm.

In the embodiment shown in FIGS. 2 and 3, the control means 52 are formed by a coil 60 provided with the plate 301 and by an electromagnet 61 provided with the body 50 (in the wall 50c opposite to the wall 50a) and controlled by the control signals 32 of the control circuit 31.

In the configuration of the plates 301 and 302 shown in FIGS. 2 and 4, the plates 301 and 302 mate each other. There is a first gap between the plate 301 and the body 50, with a height "d" which is substantially constant, as shown in FIG. 4. By way of illustration only, the height d is typically equal to 0.3 mm. It is noted, in this configuration, that the total thickness D, i.e. the sum of the thickness of the plate 301, the first gap, and the thickness of the plate 302 along the $Z_A$-axis, is substantially constant. By way of illustration only, the total thickness D approximately equals 2 mm. There is also a second gap between the plate 301 and the plate 302, with a height "h" along the $Z_A$-axis which, in this configuration, equals a substantially constant value, $h_O$. The value of the height h is chosen as explained below. It is noted that, in this configuration, the positions of the aspheric surfaces 302a and 301b in the base (A, $X_A$, $Y_A$, $Z_A$) (shown in FIG. 2) are given by $S_1(x, y)$ and $h+S_1(x, y)$, respectively.

In the configuration of the plates shown in FIGS. 3 and 5, there is a mutual rotational displacement of the plates 301 and 302 over the angle Φ as about the axis $Z_A$ as shown in FIG. 3. In this embodiment, the plate 301 is rotated by the angle Φ and the plate 302 is stationary, that is, remains in the same position than in the configuration shown in FIG. 2. The value of the angle Φ is chosen as explained below. It is noted, in this configuration, that the height h between the plates 301 and 302 is no longer substantially constant, because of the asphericity of the exit surface 301b and the entrance surface 302a. This results in different optical paths for the radiation beam emerging from the exit surface 301b of the plate 301. As a result, in this embodiment, the wavefront modification $W_1$ is introduced in the radiation beam 15 for correcting coma in the converging beam 16.

During scanning of a track T of the record carrier 3 and with reference to FIG. 2, the optical scanning device 1 can be oriented with respect to the record carrier 3 so that the radial direction (Y) of the track T is parallel to the $Y_A$-axis and the tangential direction (X) of the track T is parallel to the $X_A$-axis. Thus, the wavefront modifier 30 can introduce, in the embodiment shown in FIG. 1, the amount of coma $W_2$ in the radial direction (Y) or the tangential direction (X) of the track T. As a example only, the design of the aspheric surfaces 301b and 302a is now described in relation to the embodiment of the optical scanning device 1 for compensating the amount of coma $W_2$ in the tangential direction (X) of the track T. The function S is designated, in this example, by the reference "$S_1$".

The amount of coma $W_2$ along the tangential direction (X) can be represented as follows:

$$W_2(x, y)=A_1 x(x^2+y^2) \qquad (3)$$

where "(x, y)" are the Cartesian coordinates in the direct orthogonal system $X_O Y_O$ in the reference plane $X_A Y_A$ and having its origin on the second point of intersection O of the optical axis 12 and the reference plane $X_A Y_A$, the $Y_O$-axis passing through the first point of intersection A, and "$A_1$" is a parameter which is constant in terms of (x, y) and which depends on the value of the tilt angle of the disc-shaped record carrier 3. It is also noted that (O, $X_O$, $Y_O$, $Z_O$) are two direct orthogonal base.

When substituting Equation (3) in Equation (2), it is found in the (O, $X_O$, $Y_O$, $Z_O$) base that:

$$W_1(x, y) = -A_1 x(x^2+y^2) \quad (4)$$

After substituting Equation (1b) in Equation (4), it is found that the function $S_1$ associated with the aspheric surface 301b is given by:

$$S_1(r;\theta) = B_1 r \sin\theta (r^2 - Rr \sin\theta + R^2) + f_1(r) \quad (5)$$

where "$B_1$" is a constant parameter defined by:

$$B_1 = \frac{-A_1}{(n-1)\varphi} \quad (6)$$

"$f_1(r)$" is a function of the polar coordinate r, that is symmetrical with respect to the $Z_A$-axis, and "R" is the distance between the points of intersection A and O and has a sign determined by:

$$R > 0, \text{ if } \vec{OA} \cdot \vec{v} < 0 \text{ or}$$

$$R \leq 0, \text{ if } \vec{OA} \cdot \vec{v} \geq 0$$

wherein $\vec{v}$ is a unitary vector of the $Y_O$-axis.

Expressed in the polar coordinates (r, θ) in Equation (5), it is found that the function $S_1$ can also be expressed in the Cartesian coordinates (x, y) with respect to (O, $X_O$, $Y_O$, $Z_O$) as follows:

$$S_1(x, y) = B_1(y+R)(x^2+(y+R)^2-yR) + f_1(\sqrt{x^2+(y+R)^2}) \quad (7)$$

Thus, the shapes of the aspheric surface 301b and 302a can be designed, in this example, by knowing Equation (7) and choosing the values of the parameter $B_1$ and the distance R.

The choice of the distance R depends on the geometry of the collimated beam 14. By way of illustration only, the distance |R| may be chosen between 3 mm and 6 mm.

The choice of the value of the parameter $B_1$ depends on the parameter A, (n−1) and the angle Φ pursuant to Equation (6). Thus, it is noted that, considering a given amount of coma to be compensated, i.e. a given value of the parameter A, there is a trade-off between the choice of the values of the parameter $B_1$ and of the angle Φ. For instance, if a large value of the parameter $B_1$ is chosen, the aspheric surface 301b is then designed with a relatively large peak-to-peak value in height. This results in an important curvature of the surface 301a, thereby making the plate 301 difficult to rotate. By contrast, the choice of a large value of the angle Φ requires a rotational displacement of the plate 301 in the body 50 with a large amplitude, thereby making the wavefront modifier 30 difficult to make. By way of illustration only, the values of the angle Φ is comprised between −3 and +3 degrees.

Regarding the mutual positioning of the aspheric surfaces 301b and 302a, the value $h_0$ of the height h (shown in FIG. 4) must be chosen. It is noted that the choice of the value $h_0$ is dependent on the rotation of the plate 301 over the angle Φ and the parameter $B_1$. Thus, a large value $h_0$ allows the plate 301 to rotate without being into contact with the stationary plate 302. However, it is noted that the rotation of the plate 301 over the angle Φ also generate an amount of astigmatism $W_3$ that depends on the height of the gap between the plates 301 and 302. Ray-tracing simulations have been made from Equation (7) with different values $h_0$. The results of these simulations are shown in Table 1 below. Table 1 shows the root-mean-square values $W_{1,rms}$ and $W_{3,rms}$ of the amount of coma $W_1$ and the amount of astigmatism $W_3$ for the different values $h_0$, in the case where the shapes of the aspheric surfaces 301b and 302a are defined by the function $S_1$ according to Equation (5) and under the following conditions: Φ=2 degrees; R=3.6 mm; $B_1$=0.004 mm$^{-2}$; φ=3 mm; and λ=405 mm, where "φ" and "λ" are the diameter and the wavelength of the collimated beam 14, respectively. It is noted that coma and astigmatism have been expressed in the form of the Zernike coefficients as known, e.g., from said book by M. Born, pp. 469–470.

TABLE 1

| $h_0$ (μm) | $W_{1,\,rms}$ (mλ) | $W_{3,\,rms}$ (mλ) |
|---|---|---|
| 0 | 70 | 10 |
| 10 | 70 | 17 |
| 50 | 70 | 43 |

Therefore, the value $h_0$ must be chosen sufficiently high such that the plate 301 can rotate without being into contact with the stationary plate 302. It must also be sufficiently low so that the rotation of the plate 301 generates a low amount of astigmatism $W_3$. It has been found that, due to the rotation of the plates 301 and 302, the height $h_0$ must be higher than 0.6 μm.

It is to be appreciated that numerous variations and modifications may be employed in relation to the embodiments described above, without departing from the scope of the invention which is defined in the appended claims.

In particular, the wavefront modifier 30 shown in FIGS. 1 through 6 may be adapted for modifying a wavefront modification other than coma in the tangential direction (X). For instance, as an alternative to the optical scanning device shown in FIG. 2, the aspheric surfaces 301b and 302b are shaped so as to generate the wavefront modification $W_1$ for compensating the coma aberration $W_2(x, y)$ ($=A_2 y(x^2+y^2)$) along the $Y_O$-axis (radial direction). The shapes of the aspheric surfaces are substantially defined by a function $S_2$ given by:

$$S_2(x, y) = -B_2 R(2(x^2 + (y+R)^2) + R^2)\arctan\left(\frac{y+R}{x}\right) - B_2(x^2 + (y+R)^2 + 3R^2) + B_2 Rx(y+R) + f_2\left(\sqrt{x^2 + (y+R)^2}\right)$$

where "$B_2$" is a constant parameter in terms of the Cartesian coordinates (x, y) with respect to (O, $X_O$, $Y_O$, $Z_O$) and "$f_2$" is a function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the tilt aberration $W_2(x, y)$ ($=A_3x$) along the $X_O$-axis (tangential direction). The shapes of the aspheric surfaces are substantially defined by a function $S_3$ given by:

$$S_3(x, y) = B_3(y+R) + f_3(\sqrt{x^2 + (y+R)^2})$$

where "$B_3$" is a constant parameter in terms of the Cartesian coordinates (x, y) with respect to (O, $X_O$, $Y_O$, $Z_O$) and "$f_3$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the tilt aberration $W_2(x, y)$ ($=A_4y$) along the $Y_O$-axis (radial direction). The shapes of the aspheric surfaces are substantially defined by a function $S_4$ given by:

$$S_4(x, y) = B_4x + f_4(\sqrt{x^2 + (y+R)^2})$$

where "$B_4$" is a constant parameter in terms of the Cartesian coordinates (x, y) with respect to (O, $X_O$, $Y_O$, $Z_O$) and "$f_4$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the defocus aberration $W_2(x, y)$ ($=A_5(x^2+y^2)$). The shapes of the aspheric surfaces are substantially defined by a function $S_5$ given by:

$$S_5(x, y) = B_5(x^2 + (y+R)^2)\arctan\left(\frac{y+R}{x}\right) + 2B_5Rx + f_5\left(\sqrt{x^2 + (y+R)^2}\right)$$

where "$B_5$" is a constant parameter in terms of the Cartesian coordinates (x, y) with respect to (O, $X_O$, $Y_O$, $Z_O$) and "$f_5$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the astigmatism aberration $W_2(x, y)$ ($=A_6x^2$) along the $X_O$-axis (tangential direction). The shapes of the aspheric surfaces are substantially defined by a function $S_6$ given by:

$$S_6(x, y) = B_6(x^2 + (y+R)^2)\arctan\left(\frac{y+R}{x}\right) + B_6x(y+R) + f_6\left(\sqrt{x^2 + (y+R)^2}\right)$$

where "$B_6$" is a constant parameter in terms of the Cartesian coordinates (x, y) with respect to (O, $X_O$, $Y_O$, $Z_O$) and "$f_6$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the astigmatism aberration $W_2(x, y)$ ($=A_7y^2$) along the $Y_O$-axis (radial direction). The shapes of the aspheric surfaces are substantially defined by a function $S_7$ given by:

$$S_7(x, y) = B_7(x^2 + (y+R)^2)\arctan\left(\frac{y+R}{x}\right) - B_7x(y+R) + f_7\left(\sqrt{x^2 + (y+R)^2}\right)$$

where "$B_7$" is a constant parameter in terms of the Cartesian coordinates (x, y) with respect to (O, $X_O$, $Y_O$, $Z_O$) and "$f_7$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the spherical aberration $W_2(x, y)$ ($=A_8(x^2+y^2)^2$). The shapes of the aspheric surfaces are substantially defined by a function $S_8$ given by:

$$S_8(x, y) = B_8((x^2 + (y+R)^2)^2 + 4R^2(x^2 + (y+R)^2) + R^4)\arctan\left(\frac{y+R}{x}\right) + 4B_8R(x^2 + (y+R)^2) + R^2)x - 2B_8R^2x(y+R) + f_8\left(\sqrt{x^2 + (y+R)^2}\right)$$

where "$B_8$" is a constant parameter in terms of the Cartesian coordinates (x, y) with respect to (O, $X_O$, $Y_O$, $Z_O$) and "$f_8$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the line coma aberration $W_2(x, y)$ ($=A_9y^3$) along the $Y_O$-axis (radial direction). The shapes of the aspheric surfaces are substantially defined by a function $S_9$ given by:

$$S_9(x, y) = -\frac{2B_9}{3}x^3 - B_9x(y+R)^2 + f_9\left(\sqrt{x^2 + (y+R)^2}\right)$$

where "$B_9$" is a constant parameter in terms of the Cartesian coordinates (x, y) with respect to (O, $X_O$, $Y_O$, $Z_O$) and "$f_9$" is function of the Cartesian coordinates (x, y) with respect to (O, $X_O$, $Y_O$, $Z_O$) that is symmetrical with respect to the $Z_A$ axis.

As another alternative to the optical scanning device shown in FIG. 2, the aspheric surfaces 301b and 302b are shaped so as to generate the wavefront modification $W_1$ for compensating the line coma aberration $W_2(x, y)$ ($=A_{10}x^3$) along the $X_O$-axis (tangential direction). The shapes of the aspheric surfaces are substantially defined by a function $S_{10}$ given by:

$$S_{10}(x, y) = B_{10} x^2 (y + R) + \frac{2 B_{10}}{3} (y + R)^3 + f_{10}\left(\sqrt{x^2 + (y + R)^2}\right)$$

where "$B_{10}$" is a constant parameter in terms of the Cartesian coordinates (x, y) with respect to (O, $X_O$, $Y_O$, $Z_O$) and "$f_{10}$" is function of the Cartesian coordinates (x, y) with respect to (O, $X_O$, $Y_O$, $Z_O$) that is symmetrical with respect to the $Z_A$ axis.

It is noted that the functions $S_1$ through $S_{10}$ are not disclosed in said article by Palusinski.

An alternative of the wavefront modifier 30 shown in FIGS. 3 and 5 is arranged so that the plate 302 is rotated by an angle +Φ about the axis $Z_A$ and the plate 301 is stationary.

Another alternative of the wavefront modifier 30 shown in FIGS. 3 and 5 is arranged so that the plate 302 is rotated by an angle +Φ about the axis $Z_A$ and the plate 301 is rotated by an angle −Φ about the axis of rotation $Z_A$ by means of an additional hinge provided with the plate 302 similarly to the hinge described with reference to FIG. 6.

Another alternative of the wavefront modifier 30 shown in FIGS. 3 and 5 is the aspheric surface 301b and/or the aspheric surface 302a include(s) at least a step-function Q(r, θ) which equals a nonzero constant parameter "q" for a portion of the corresponding aspheric surface, and zero for the remaining part of that surface. The parameter "q" is substantially equal to mλ/(n−1) where "λ" is the wavelength of the collimated beam 14, "m" is an integer value and "n" is the refractive index of the corresponding plate. Hence the corresponding plate is modified in a similar way as a Fresnel lens known, e.g., from the book by W. J. Smith, "Modern Optical Engineering", pp. 257–258 (McGrraw-Hill, 2d Ed.) (ISBN 0-07-059174-1)). It is noted that the functions $S_a$(r, θ) and $S_b$(r, θ) may also include such a step-function Q.

In an alternative of the body 50 shown in FIGS. 2 and 3, the plates 301 and 302 are provided so that the point of intersection A is located in the close vicinity of the inner wall 50b, 50c or 50d of the body 50. The location of the point A can be chosen in order to make the function that defines the shape of the aspheric surfaces 301b and 302a more simple.

In an alternative of the optical scanning device shown in FIG. 1, the objective lens 18 may be formed by said first and second elements having said first and second aspheric surfaces, respectively.

In another alternative of the optical scanning device shown in FIG. 1, the wavefront modifier 30 may be arranged in the optical path of the light between the radiation source and the position of the scanning spot other than in the optical path of the collimated beam 14. It is noted that the shapes of the plates 301 and 302 must be adapted to the dimensions of the radiation beam in the optical path of which the wavefront modifier is arranged. By way of illustration only, FIG. 7 shows an alternative to the plates 301 and 302 shown in FIG. 4, in the form of the plates 301' and 302'. As shown in FIG. 7, the plates 301' and 302' are arranged in the optical path of a diverging radiation beam and the surfaces 301a', 301b', 302a' and 302b' are adapted to the variable dimensions of the radiation beam along its axis of propagation.

As an improvement of the wavefront modifier show in FIG. 1, the wavefront modifier can be provided with a position detector which is known from PH-N 17.844 and incorporated herein by reference. It is noted that the wavefront modification $W_1$ will only compensate the wavefront distortion $W_2$ only if the wavefront modification $W_1$ is correctly centred with respect to the optical axis 12 of the objective lens 18. The compensation is not correct if wavefront modification $W_1$ is centred on the axis of the collimated beam 14 and if the objective lens 18 is displaced in the radial direction (Y) because of radial tracking.

Furthermore, the wavefront modifier 30 shown in FIGS. 1 through 6 may be used for modifying a wavefront modification for optical devices other than the optical scanning device 1 shown in FIG. 1. For instance, the wavefront modifier is suitable for a zoom lens; it generates a wavefront modification in the form of defocus in order to change the focal length of the zoom lens, thereby making the focal length adjustable.

The invention claimed is:

1. An optical scanning device (1) for scanning an information layer (2) of an optical record carrier (3) by means of a radiation beam (4), including:
   a radiation source (6) for providing said radiation beam,
   a lens system (7) for transforming said radiation beam to a converging radiation beam (16) so as to form a scanning spot (17) in the position of the information layer, the lens system including a first objective lens (18) having an optical axis (12), and
   a wavefront modifier (30) arranged between said radiation source and the position of said scanning spot, the wavefront modifier including a first element (301) having a first aspheric surface (301b) and a second element (302) having a second aspheric surface (302a), said first and second elements being mutually movable in a plane perpendicular to said optical axis for introducing a wavefront modification $W_1$ in said converging beam,
   characterized in that said first and second aspheric surfaces are shaped so that a mutual rotational displacement of said first and second elements over an angle of rotation (Φ) about an axis of rotation ($Z_A$) which is parallel to said optical axis (12) generates said wavefront modification $W_1$.

2. The optical scanning device (1) as claimed in claim 1, wherein the shape of said first aspheric surface (301b) is defined by a function $S_a$(r, θ) and the shape of said second aspheric surface (302a) is defined by a function $S_b$(r, θ), the function $S_a$(r, θ) and $S_b$(r, θ) being determined by:

$$W_1(r, \theta) \approx (n_a - 1) \varphi_a \frac{\partial S_a}{\partial \theta} - (n_b - 1) \varphi_b \frac{\partial S_b}{\partial \theta}$$

where "(r, θ)" are polar coordinates in a reference plane $X_A Y_A$ perpendicular to the optical axis 12, these coordinates being centered on the first point of intersection A of the axis of rotation $Z_A$ and the reference plane $X_A Y_A$, "$W_1$(r, θ)" is the wavefront modification expressed in the polar coordinates (r, θ), "$n_a$" is the refractive index of the first element and "$n_b$" is the refractive index of the second element, "$\Phi_a$" is said angle of rotation of the first element and "$\Phi_b$" is said angle of rotation of the second element, and "$S_a$(r, θ)" represents the shape of the first aspheric surface and "$S_b$(r, θ)" represents the shape of the second aspheric surface.

3. The optical scanning device (1) as claimed in claim 1, wherein the shapes of said first and second aspheric surfaces (301b, 302a) are substantially identical and the shape of said first surface is defined by a function $S(r, \theta)$ determined by:

$$W_1(r, \theta) \approx (n-1)\varphi \frac{\partial S}{\partial \theta}$$

where "(r, θ)" are polar coordinates in a reference plane ($X_A Y_A$) perpendicular to said optical axis (12), these coordinates being centered on the first point of intersection (A) of said axis of rotation ($Z_A$) and said reference plane, "$W_1(r, \theta)$" is said wavefront modification expressed in the polar coordinates (r, θ), "n" is the refractive index of said first and second elements, "Φ" is said angle of rotation, and "$S(r, \theta)$" represents the shape of said first aspheric surface.

4. The optical scanning device (1) as claimed in claim 2, wherein said functions $S_a(r, \theta)$ and $S_b(r, \theta)$ and/or $S(r, \theta)$ include(s):

the term "$(y+R)(x^2+(y+R)^2-yR)$" for introducing said wavefront modification $W_1$ in the form of coma along the X-axis, the term $$\text{``}-R(2(x^2+(y+R)^2)+R^2)\arctan\!\left(\frac{y+R}{x}\right)-$$
$$(x^2+(y+R)^2+3R^2)+Rx(y+R)\text{''}$$

for introducing said wavefront modification $W_1$ in the form of coma along the Y-axis, the term "y+R" for introducing said wavefront modification $W_1$ in the form of tilt along the X-axis, the term "x" for introducing said wavefront modification $W_1$ in the form of tilt along the Y-axis, the term $$\text{``}(x^2+(y+R)^2)\arctan\!\left(\frac{y+R}{x}\right)+2Rx\text{''}$$

for introducing said wavefront modification $W_1$ in the form of defocus, the term $$\text{``}(x^2+(y+R)^2)\arctan\!\left(\frac{y+R}{x}\right)+x(y+R)\text{''}$$

for introducing said wavefront modification $W_1$ in the form of astigmatism along the X-axis, the term $$\text{``}(x^2+(y+R)^2)\arctan\!\left(\frac{y+R}{x}\right)-x(y+R)\text{''}$$

for introducing said wavefront modification $W_1$ in the form of astigmatism along the Y-axis, the term $$\text{``}((x^2+(y+R)^2)+4R^2(x^2+(y+R)^2+R^4)\arctan\!\left(\frac{y+R}{x}\right)+$$
$$4R((x^2+(y+R)^2)+R^2)x-2R^2x(y+R)\text{''}$$

for introducing said wavefront modification $W_1$ in the form of spherical aberration, the term $$\text{``}-\frac{2}{3}x^3-x(y+R)^2\text{''}$$

for introducing said wavefront modification $W_1$ in the form of line coma along the Y-axis, or the term $$\text{``}x^2(y+R)+\frac{2}{3}(y+R)^3\text{''}$$

for introducing said wavefront modification $W_1$ in the form of line coma along the X-axis, where "(x, y)" are the Cartesian coordinates in the direct orthogonal system $X_O Y_O$ in said reference plane ($X_A Y_A$) and having its origin on the second point of intersection (O) of said optical axis (12) and said reference plane, the $Y_O$-axis passing through said first point of intersection (A), and "R" is the distance between said first point of intersection (A) and said second point of intersection (O).

5. The optical scanning device (1) as claimed in claim 2, wherein said functions $S_a(r, \theta)$ and $S_b(r, \theta)$ and/or $S(r, \theta)$ includes at least a step-function $Q(r, \theta)$ which equals:

a nonzero constant parameter (q) for a portion of the corresponding aspheric surface, that parameter being substantially equal to $m\lambda/(n-1)$ where "λ" is the wavelength of the radiation beam in the optical path of which said wavefront modifier (30) is arranged, "m" is an integer value and "n" is the refractive index of the corresponding element, and zero for the remaining part of that surface.

6. The optical scanning device (1) as claimed in claim 1, wherein said axis of rotation ($Z_A$) is eccentric with respect to said optical axis (12).

7. The optical scanning device (1) as claimed in claim 6, wherein said axis of rotation ($Z_A$) is outside of the cross-section of the radiation beam incident on said first and second elements (301, 302).

8. The optical scanning device (1) as claimed in claim 1, wherein said detection system (10) is arranged for providing a focus error signal ($S_{focus}$) and/or a radial-tracking error signal ($S_{radial}$) and in that it further includes a servo circuit (11) and an actuator (12, 13) responsive to said focus error signal and/or said radial-tracking error signal for controlling the positions of said scanning spot (17) with respect to the position of said information layer (2) and/or of a track of said information layer which is to be scanned.

9. The optical scanning device (1) as claimed in claim 1, further including an information processing unit for error correction (14).

10. The optical scanning device (1) as claimed in claim 1, further including a wavefront compensator (19) which includes:
- an aberration detector (33) for providing a detection signal (35) representative of a wavefront distortion $W_2$ present in said converging radiation beam (16), and
- said wavefront modifier (30) arranged for, in response to said detection signal, introducing said wavefront modification $W_1$ so that $W_2+W_1=0$.

11. A wavefront modifier (30) for transforming a first radiation beam into a second radiation beam, the wavefront modifier having an optical axis (12) and including a first element (301) having a first aspheric surface (301*b*) and a second element (302) having a second aspheric surface (302*a*), said first and second elements being mutually movable in a plane perpendicular to said optical axis for introducing a wavefront modification ($W_1$) in said second radiation beam, characterized in that said first and second aspheric surfaces are shaped so that a mutual rotational displacement of said first and second elements about an axis of rotation ($Z_A$) which is parallel to said optical axis (12) generates said wavefront modification ($W_1$).

* * * * *